March 28, 1939.　　L. L. GRENEKER　　2,151,846
FINGER-FIT IMPLEMENT
Filed Nov. 6, 1934
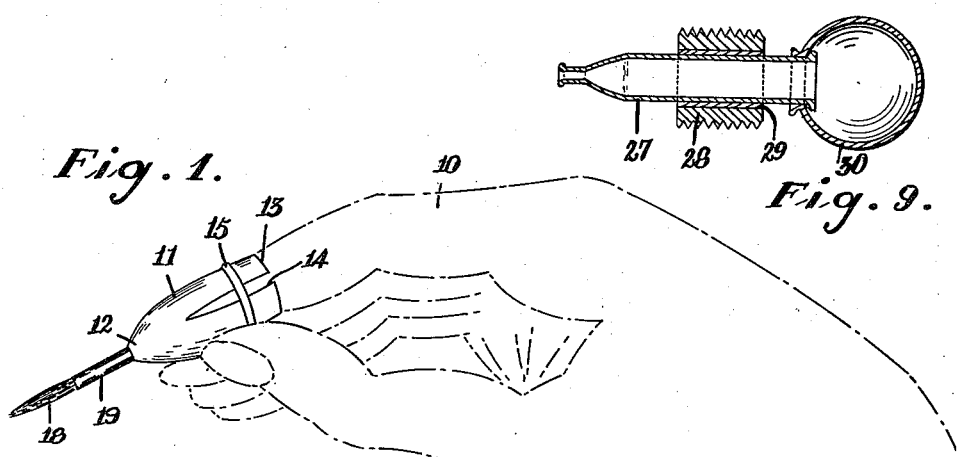
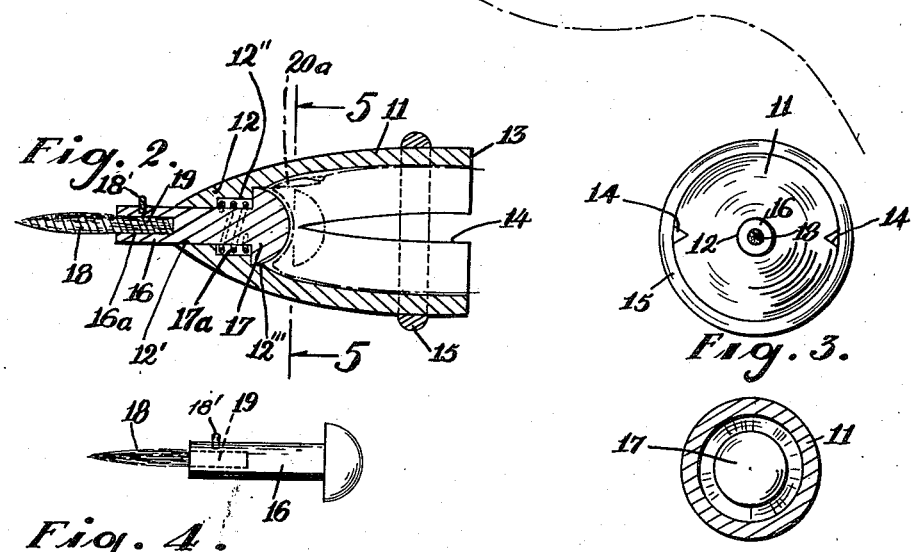
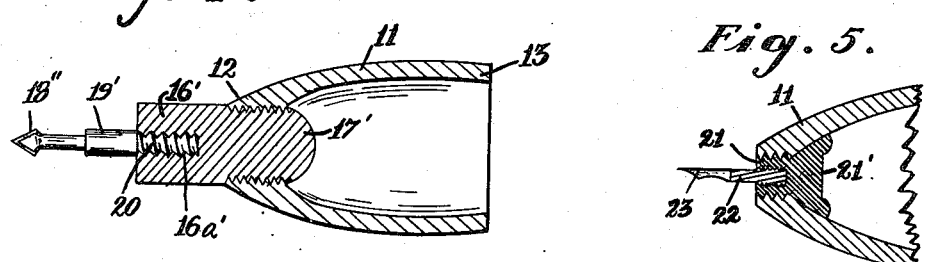
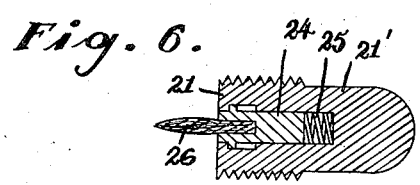
LILLIAN L. GRENEKER
INVENTOR
BY *Alexander Meucher*
ATTORNEY Patented Mar. 28, 1939

2,151,846

UNITED STATES PATENT OFFICE 2,151,846

FINGER-FIT IMPLEMENT

Lillian L. Greneker, New York, N. Y.

Application November 6, 1934, Serial No. 751,791

5 Claims. (Cl. 81—1)

This invention relates generally to finger stalls, but more specifically to finger stalls or thimbles adapted to have mounted along the longitudinal axis thereof implements and tools ordinarily operated by finger manipulation about the handles thereof.

The main object of the invention herein is the provision of a finger stall having a nose portion from the exterior surface of which extends an implement or tool coaxial with the axis of the said finger stall, while from the interior surface extends a finger tip rest over the edge of which the nail of the finger tip is clamped against the interior surface of the said finger stall.

Another object of the invention resides in the provision of a finger stall which is adjustable for several sizes and wherein the nose thereof is capable of removal if so desired.

A further object of the invention resides in the provision of a finger stall structure which is capable of being mounted on the finger tip with means of sensitive adjustment for size of the finger and with means for permitting the rotation of the said finger stall about the finger tip.

These objects and other incidental ends and advantages will hereinafter appear in the progress of the disclosure and as pointed out in the appended claims.

The accompanying drawing forming a part hereof shows several views of preferred forms of the invention wherein corresponding characters designate corresponding parts of the several views.

Figure 1 is a view in perspective showing the finger stall as applied to the finger tip and having a tool or implement such as a finger paint brush on the nose or tip portion of the said stall.

Figure 2 is a sectional view of the finger stall along the longitudinal axis thereof and with a tool attached.

Figure 3 is an elevational view of the finger stall of Figure 2 taken from the nose portion thereof.

Figure 4 is a view in elevation showing the tool of Figure 2 as independent of the finger stall, the said tool being a paint brush as shown.

Figure 5 is a sectional view of Figure 2 along the line 5—5 thereof.

Figure 6 is a sectional view of a finger stall along the longitudinal axis and with a tool attached showing another form of the invention.

Figure 7 is the forward portion of a finger stall in section showing a threaded plug having a pen therein penetrating the orifice in the nose portion.

Figure 8 is a sectional view of a plug portion for the finger stall showing a brush springably mounted therein.

Figure 9 is a sectional view of a plug portion for the finger stall showing an eye dropper mounted therein.

In accordance with the invention and in accordance with the figures above described, numeral 10 designates the conventional hand having the index finger provided with an embodiment of the invention. The finger stall is comprised of a hollow body 11 made of any suitable material such as metal or composition and has a nose portion 12 and a mouth portion 13. Body 11 is provided with two longitudinal and diametrically opposed notches 14 to provide adjustability of the finger stall on fingers of different sizes. Cooperating with the said notches 14 is a band member 15 adapted to form a movable sleeve about body 11 in a way so that upon movement from nose portion 12 to the mouth 13, body 11 is tightened about the finger of the operator.

In the form of the invention as shown in Figure 2, nose 12 of the finger stall is provided with an orifice 12' along the longitudinal axis thereof through which a plug passes, the said plug being capable of assuming many shapes. In Figure 2, the plug is composed of a shank portion 16 projecting outwardly from nose 12 and a head portion 17 being convex at the inwardly protruding surface thereof, the said head portion 17 projecting inwardly of nose 12 and along the longitudinal axis of the finger stall. Orifice 12' of the nose of body 11 is provided with two successively enlarged portions 12" and 12''', a spring 17a being affixed to the outer wall of enlarged portion 12" and extending inwardly to the base of head 17, the said spring surrounding shank 16 adjacent the base of head 17. Head 17 is thereby adapted to fit snugly in enlarged portion 12''' of orifice 12' when the said plug member is at the limiting compressed position. Spring 17A is adapted to give the operator sensitive control over the pressure exerted on brush 18. By compressing or releasing head 17 to any desirable extent the operator can cause brush 18 to function lightly, delicately or heavily. Moreover, brush 18 is thereby sensitively controlled by the finger-tip in addition to the normal pressure exerted on body 11. In order to voluntarily change the pressure of the index finger tip upon the convex head 17 and therewith upon the compressed spring 17a the thimble 11 is held as shown in Figure 1, with the thumb pressing upon the outside of the conical wall. The frictional grasp thus exerted allows the index-finger to be withdrawn more or less, releasing the spring temporarily or increasing the compression of the spring respectively. If during this manipulation the hand as a whole is kept steady, the pressure of the brush can be varied at leisure. Rotation of the thimble may also be effected by the thumb. The plug is fixed in orifice 12' by frictional engagement therewith, while the shank portion 16 is provided with an orifice 16a to receive any tool therein such as brush 18 by any mounting means such as frictional engagement. Numeral 18' is a stop such as a removable projection on the forward portion of shank 16 and is adapted to prevent the projection of the plug member through the spring tension of 17a through orifice 12' of body 11. There is sufficient clearance between head portion 17 and the internal surface of the finger stall to permit rotation of the finger relative to the finger stall while the center of the finger tip rests against the center of the convex surface of head 17. The normal position of the index-fingernail is indicated by 20a.

The finger stall thus executes with extreme sensitivity movements and changes of pressure of the finger tip to whatever tool or implement is affixed to the plug member.

In Figure 6 shank 16' and head 17' form a plug member for nose 12 of the finger stall. Shank 16' has an orifice 16a', and is threaded to engage a threaded shank 20 of a tool such as the pointed instrument 18"—19' of Figure 6.

Figure 7 shows a finger stall body 11 having a threaded orifice through the nose portion thereof coaxial with the longitudinal axis of the said body 11. In threaded engagement with the said orifice is a plug member having a head portion 21' extending inwardly of body 11, and a threaded engaging portion 21 of the plug, and is flush with the flattened tip of the body member 11. Engaging portion 21 of the plug has a central and longitudinal threaded orifice for engagement with any finger implement or tool such as pen 23, while head portion 21' at the engaging surface with the finger tip is concave to render relative movement between the finger stall and the finger more facile.

Figure 8 shows a plug member having a central and longitudinal threaded orifice to springably engage a tool such as a brush, the said brush being mounted against a spring 25 at the base of the said orifice by means of a holder 24 for the bristles 26. Such mounting can be employed for very delicate work.

Figure 9 shows a plug member 28 which is actually a mounting for an eye-dropper, the internal surface of the orifice in the said plug member 28 having a soft bushing or sleeve for the eye dropper tube 27; the numeral 30 designating the normal bulb adapted to be situated internally of body 11 and acted upon by the finger tip within the finger stall.

A finger stall has been presented capable of having mounted therein a variety of finger implements and tools with provision for adjustability of size and relative rotation of the finger.

I wish it understood that minor changes and variations in the integration of the several parts, the material and means of attachment of the several parts may all be resorted to without departing from the spirit of the invention and without departing from the scope of the appended claims.

I claim:

1. A finger thimble comprising a hollow body for the insertion of the finger tip and of substantially conical shape so that it may be adjustably turned around the finger tip and a plug member located in the tip end of the body along the axis thereof and having provision for supporting an instrument, said plug member extending into said body sufficiently to form a finger tip rest and the extreme inner end of said plug member being of less cross-sectional area than the remainder thereof to provide a recess for accommodating the finger nail.

2. A finger thimble according to claim 1 in which the plug is slidable in the body tip and is spring actuated.

3. A finger thimble according to claim 1 in which a resilient mounting is provided for the instrument.

4. A finger thimble comprising a hollow body for the insertion of the finger tip and of substantially conical shape so that it may be adjustably turned around the finger tip and a spring-actuated plug slidably mounted in the tip end of the body along the axis thereof and having provision for supporting an instrument, said plug member extending into said body sufficiently to form a finger tip rest.

5. A finger thimble comprising a hollow body for the insertion of the finger tip and of substantially conical shape so that it may be adjustably turned around the finger tip, a plug member located in the tip end of the body along the axis thereof, the inner end of said plug member extending into said body sufficiently to form a finger tip rest, and resilient means for supporting an instrument by said plug member.

LILLIAN L. GRENEKER.